(12) United States Patent
Rowley et al.

(10) Patent No.: US 8,147,236 B1
(45) Date of Patent: Apr. 3, 2012

(54) RESHAPING TOOL FOR POLYMERIC TUBING

(75) Inventors: William Rowley, Chagrin Falls, OH (US); William Blue, Middlefield, OH (US); Thomas K'Meyer, Ravenna, OH (US)

(73) Assignees: Mercury Plastics, Inc., Middlefield, OH (US); Masco Corporation, Taylor, MI (US)

( * ) Notice: Subject to any disclaimer, the term of this patent is extended or adjusted under 35 U.S.C. 154(b) by 90 days.

(21) Appl. No.: 12/618,089

(22) Filed: Nov. 13, 2009

(51) Int. Cl.
*B29C 57/08* (2006.01)

(52) U.S. Cl. ............... 425/392; 425/394; 425/DIG. 218

(58) Field of Classification Search .......... 425/392–396, 425/DIG. 218
See application file for complete search history.

(56) References Cited

U.S. PATENT DOCUMENTS

| | | | | |
|---|---|---|---|---|
| 2,963,068 A * | 12/1960 | Chiappe | ........................ | 72/466 |
| 4,157,372 A * | 6/1979 | Kyomen | ....................... | 425/393 |
| 4,403,938 A * | 9/1983 | Seach et al. | .................... | 425/393 |
| 4,545,951 A * | 10/1985 | Gordon | ......................... | 425/393 |
| 6,272,762 B1 | 8/2001 | Kinast et al. | | |
| 6,417,758 B1 | 7/2002 | Russell et al. | | |
| 6,761,574 B1 | 7/2004 | Song et al. | | |
| 6,789,398 B1 * | 9/2004 | Daoud et al. | .................. | 425/392 |
| 6,993,953 B2 | 2/2006 | Stupecky | | |
| 7,010,953 B2 | 3/2006 | Stupecky | | |

OTHER PUBLICATIONS

U.S. Appl. No. 12/618,332, filed Nov. 13, 2009.
U.S. Appl. No. 12/618,158, filed Nov. 13, 2009.
U.S. Appl. No. 12/618,226, filed Nov. 13, 2009.
U.S. Appl. No. 12/618,296, filed Nov. 13, 2009.

* cited by examiner

*Primary Examiner* — Richard Crispino
*Assistant Examiner* — Thukhanh Nguyen
(74) *Attorney, Agent, or Firm* — Hahn, Loeser, & Parks LLP

(57) ABSTRACT

A reshaping tool incorporates a tool head and clamp for reshaping the cross section of a tube constructed from one or more polymer materials. The clamp holds the tube in place while the head portion of the tool, which is moveable with respect to the clamp, engages the tube for reshaping its profile cross section.

9 Claims, 4 Drawing Sheets

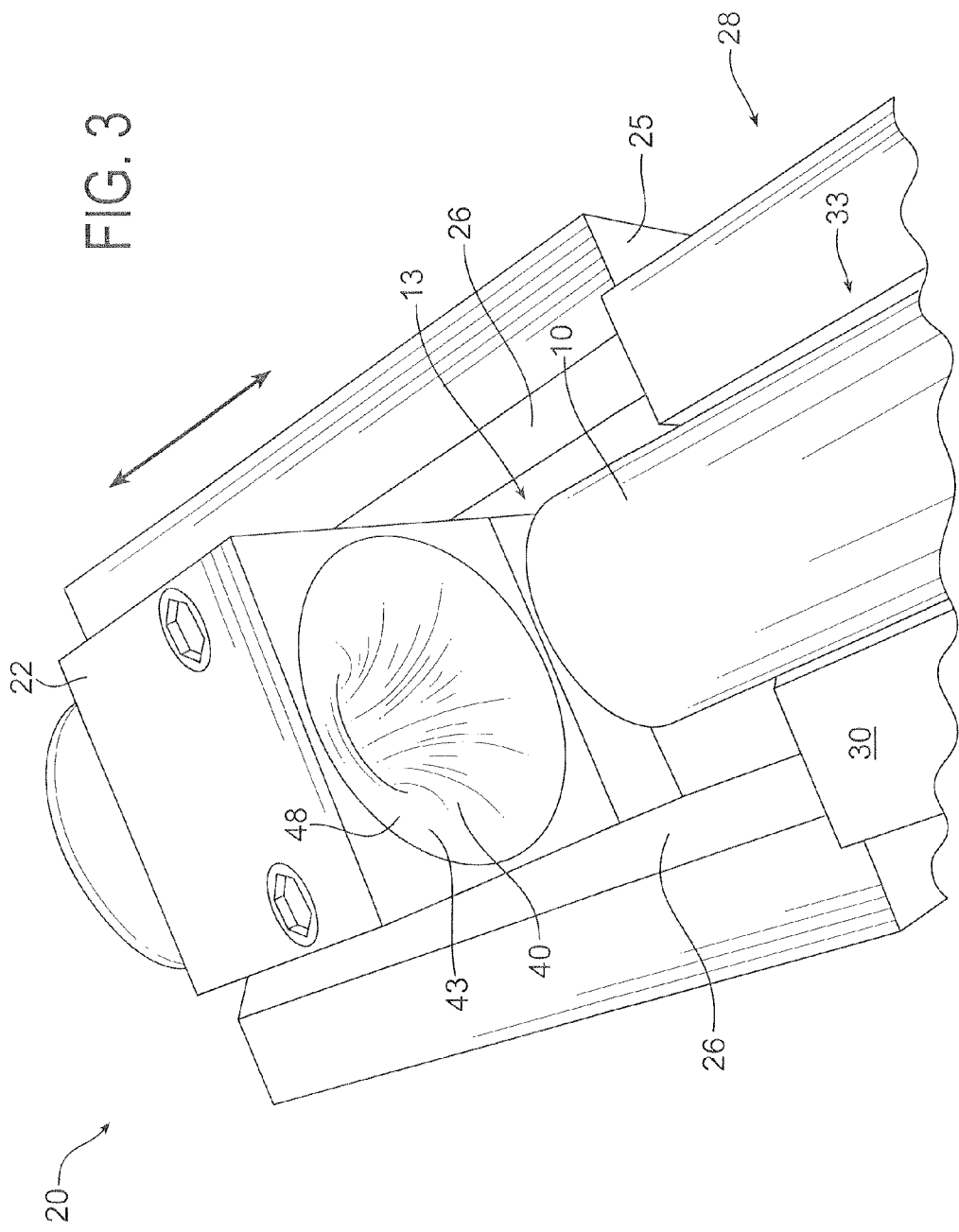

RESHAPING TOOL FOR POLYMERIC TUBING

TECHNICAL FIELD

The present invention pertains generally to tools for reshaping polymeric tubing, and more specifically, to tools that reshape the inner and outer diameter of polymeric tubing.

BACKGROUND OF THE INVENTION

Long lengths of polymeric tubing, as manufactured via an extrusion process, are typically stored in bundles and preferably wound onto a reel or spool. A spool makes it convenient to transport and/or store large quantities of tubing. In some cases, the spool extends up to five (5) feet or more in diameter, and can hold hundreds or even thousands of pounds of tubing. Tubing which is wound onto a spool also enhances and facilitates distribution, as any desired line of tubing may simply be metered from the spool and cut to length for sale or use by an end user.

Polymeric tubing is used in a wide variety of applications. The inherent flexibility of polymers make it easy for tubing to be assembled into complex and circuitous configurations. Additionally, plastic tubing is well suited for use in pressurized or non-pressurized systems. The strength of polymeric tubing can be further enhanced by cross-linking, making the tubing even more durable and resistant to deterioration from a wide variety of substances.

In a manner well known in the art, fittings may be inserted into or onto ends of the tubing for establishing a fluid tight connection between components in a system. In some cases, fittings insert over the exterior, or outer diameter ("O.D.") of the tubing, while in other cases, fittings are inserted into the interior diameter ("I.D.") of the tubing. In all instances, a fluid tight connection is needed to prevent leaks. O-rings, compression rings and other such articles are used to further ensure that the juncture between the fitting and the polymeric tubing remains secure and leak-proof.

As tubing is wound onto a spool, weight from the bundle compresses the tubing. The magnitude of distortion varies from several factors including position of the tubing on the spool, as well as the size of the spool, the quantity of tubing stored on the spool and the degree of tightness associated with the wrapping of the tubing about the spool. Distortion may also be a function of the wall thickness of the tubing as well as being dependent upon polymer composition, nature and degree of fillers, antioxidant package, crosslinking percentage, etc. When unwound, it was discovered that the initially formed circular tubing has been reshaped into an oval or elliptical configuration. Attempts to connect a fitting, valve or other component to a distorted or deformed end section of tubing frequently resulted in a leak at the interface between the components. This is particularly problematic with push-to-connect fittings.

Accordingly, end users attempt to reform or reshape the tubing. In some instances, the exterior of the tubing is the critical surface that needs reshaped, as is the case with an O.D. fitting. The interior of the tubing may similarly need reformed to seal against an internally received fitting. Pliers are one type of make-shift tooling used in the field to reshape the tubing. Leverage from the handles supply force to the exterior tubing walls. However, force from the make-shift tooling is not uniform about the circumference of the tubing, and as a result the tubing is often simply reshaped into a different elliptical configuration.

What is needed is a tool that reshapes polymer tubing evenly into a symmetrical configuration with respect to both its inner and outer diameter. A primary purpose of this invention is to provide such an arrangement with its various attendant advantages.

SUMMARY OF THE INVENTION

According to one aspect of the invention, there is provided both an apparatus and process for effecting a transformation from a non-uniform cross-sectional diametered tubing to a more uniform cross-sectional diameter. The reshaping tool for this transformation incorporates a tool head and clamp for reshaping the cross section of a tube constructed from one or more polymer materials. A clamp holds the tube in place while the tool head, which is moveable with respect to the clamp, engages the tube for reshaping its cross section. The tool head may comprise a tapered aperture and tapered head that function to shape the outer diameter and inner diameter of the tube respectively.

In one embodiment of the invention, a tubing reshaping apparatus is disclosed which includes a base; a tubing clamping means positioned on one side of said base; the tubing clamping means having a longitudinally disposed channel therein for positioning said tubing therein and minimizing movement of said tubing; a longitudinally axially movable tubing reshaping tool positioned at an opposed side of the base. The clamping means includes an upper portion; a lower portion; the upper portion in operational engagement (preferably rotational engagement) with the lower portion; the channel having a cross-sectional profile which is selected from the group consisting of "U"-shaped, "V"-shaped and "O"-shaped; and wherein when the upper and lower portions are in a closed position, the tubing is at least partially inwardly compressed when positioned within the channel for securing engagement therein. The inward compression may be accomplished by an inwardly projecting member within the channel or by the channel having a cross-sectional diameter which is smaller than the cross-sectional diameter of the tubing.

These and other objects of the present invention will become more readily apparent from a reading of the following detailed description taken in conjunction with the accompanying drawings wherein like reference numerals indicate similar parts, and with further reference to the appended claims.

BRIEF DESCRIPTION OF THE DRAWINGS

The invention may take physical form in certain parts and arrangement of parts, a preferred embodiment of which will be described in detail in the specification and illustrated in the accompanying drawings which form a part hereof, and wherein:

FIG. 3 is an enlarged perspective view of a tool for reshaping tubing.

DETAILED DESCRIPTION OF THE INVENTION

The best mode for carrying out the invention will now be described for the purposes of illustrating the best mode known to the applicant at the time. The examples are illustrative only and not meant to limit the invention, as measured by the scope and spirit of the claims. The embodiments selected for description have been chosen to enable one skilled in the art to practice the invention. Although the disclosure is described primarily in connection with liquids, it should be understood that additional types of fluids (including gases) may be used.

Figure 1:
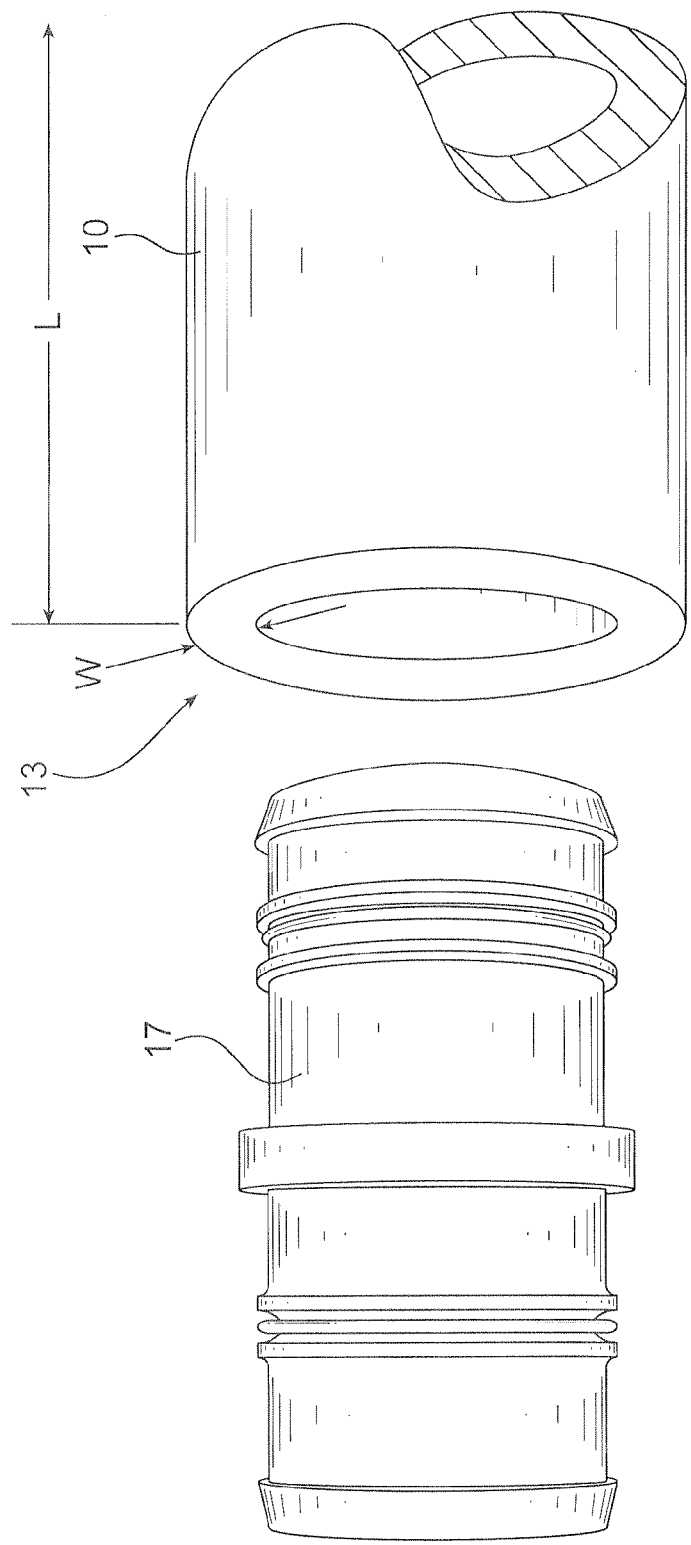
FIG. 1 is a perspective view of a partial length of polymeric tubing, a portion of which is illustrated in partial cut-away cross-section adjacent an associated I.D. (Inner Diameter) fitting.

Referring now to the drawings wherein the showings are for purposes of illustrating embodiments of the invention only and not for purposes of limiting the same, FIG. 1 shows one end of a section of tubing 10 for conveying fluid through a system, not shown in the Figures. Tube 10 may be of any chosen length suitable for use with the system and having a tubing wall thickness W dimensioned appropriately depending on the requirements of the system, i.e., pressurized or non-pressurized. Fitting 17 may be received in at least one end 13 of tube 10 and connected in a fluid tight manner to prevent the leakage of the fluid. Tubing 10 may be formed in various ways, e.g., by extrusion. As such tubing 10 may be constructed from any extrudable polymeric material, including but not limited to: PVC (polyvinyl chloride); PE (polyethylene); or PP (polypropylene). As noted above, as tubing is wound onto a spool, the combination of the inherent weight of the tubing, coupled with the degree of tightness of the wound tubing, compresses the cross-sectional profile of the tubing from an initial essentially circular cross-sectional diameter to a deformed cross-sectional diameter, which is more oval. It is recognized that any departure from circular cross-section imparts the possibility of leaks into the connection between the O.D. of fitting 17 and the I.D. of tubing 10.

Figure 1A:
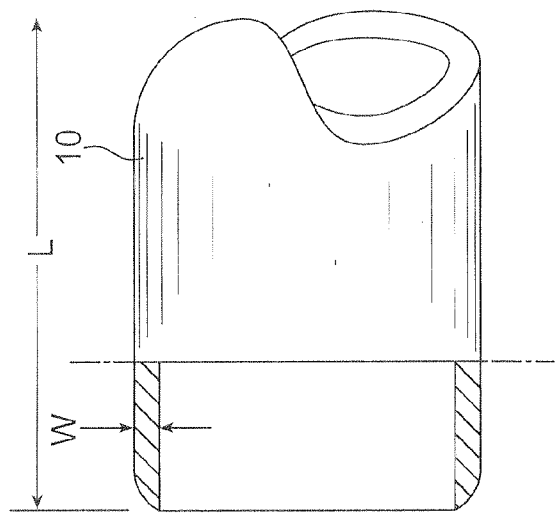
FIG. 1a is a side elevational view in partial cutaway of a partial length of polymeric tubing adjacent an O.D. (Outer Diameter) fitting.
Figure 1A:
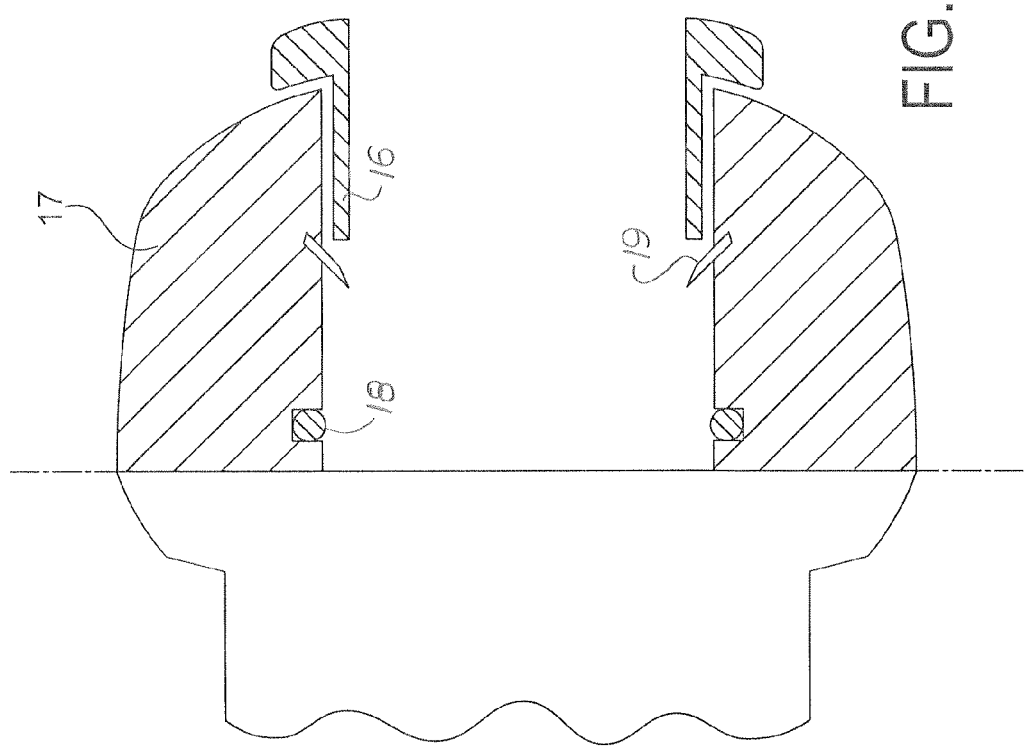

While the insertion of fittings such as that illustrated in FIG. 1 are tolerant of non-circular cross-sectional diameters, in that typically hose clamps or other externally affixed crimp rings are applied, which physically correct any non-spheroid imperfection, that is not possible with newer unidirectional "push-to-connect" fittings, as illustrated in FIG. 1a. Any non-uniformity of the diameter in a push-to-connect fitting will result in leaks due to the imperfect physical connection between inserted tubing 10 and O-ring 18 in the fitting, thereby resulting in a source of leaks to the end-user or consumer, which leads to potential liability of either the installer or manufacturer or both. There is no ability to correct the leak in that grippers or retainer blades 19 positioned inward of collet 16 permit movement only in an insertion direction, and once installed, cannot be removed without destroying the fitting.

Figure 2:
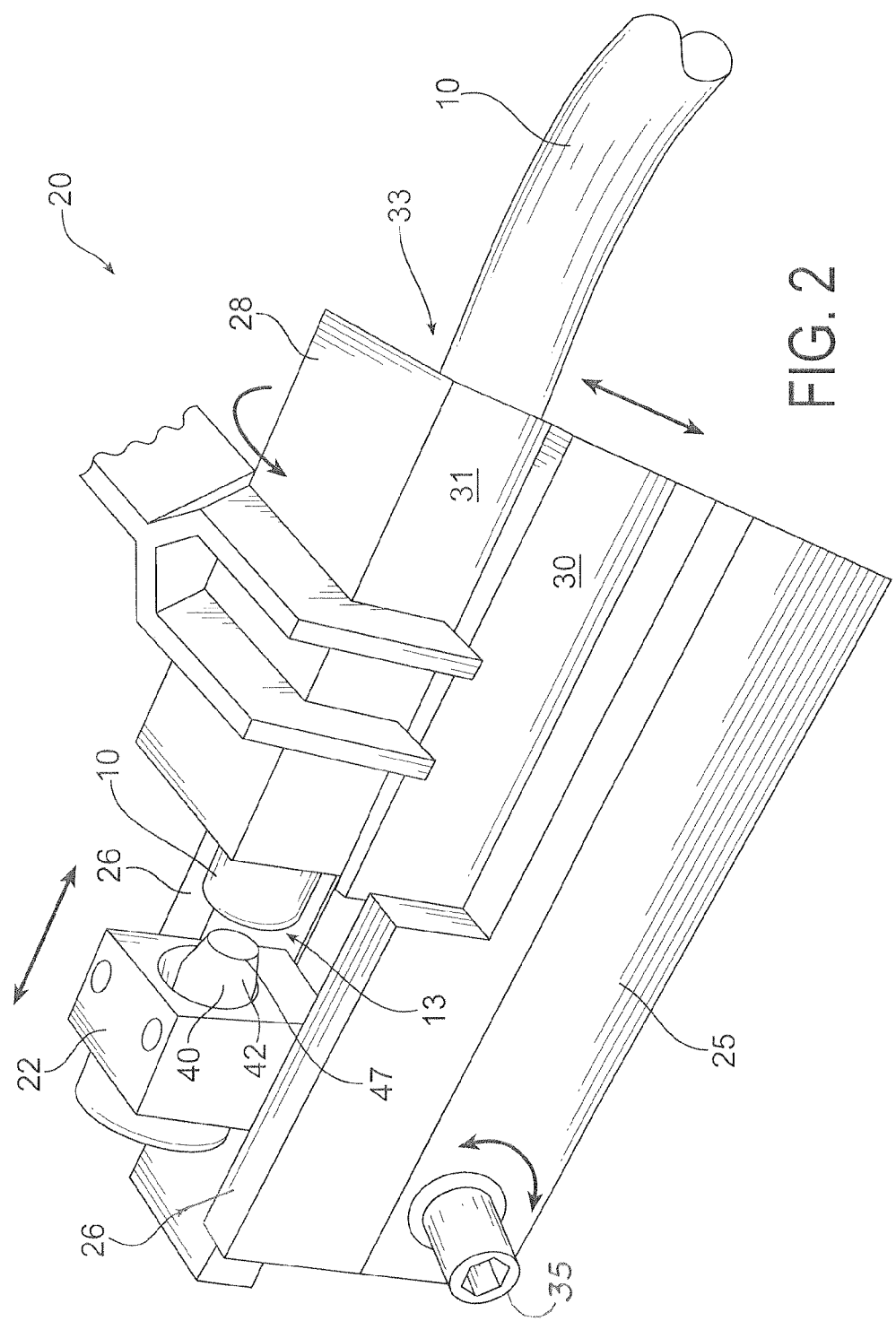
FIG. 2 is a perspective view of a tool for reshaping tubing.

FIG. 2 depicts a tubing cross-sectional profile reshaper 20, that is operable to change the cross-sectional profile shape of tube 10. In particular, reshaper 20 is operable to alter the cross-section of tubing 10 (i.e., render the diameter more uniform) making it suitable for connecting with another component, like for example fitting 17, in a fluid-tight and leak-proof manner. More specifically, reshaper 20 is constructed to reshape a generally non-uniform cross-sectional diameter of tubing 10, which may be oval, into an essentially spherical shape. While the Figures show a particular cross-sectional shape of tube, namely rounded tube, it is noted that reshaper 20 may be configured and utilized to reform any cross-sectional configuration from a deformed condition, back into its original profile. In this manner, reshaper 20 functions to reshape deformed sections of tubing 10 for subsequent connection to one or more associated components.

Reshaper 20 may include a head portion 22 and clamping means 28 that work in concert to reshape the cross-section of tubing 10. In one embodiment, head portion 22 and clamping means 28 may be connected at distal ends of a rigid frame or base 25. Base 25 may further include one or more sets of generally parallel longitudinal rails 26 configured to receive head portion 22 in a moveable manner. In one manner of movement, head portion 22 may slide along the length of the rails 26 for engaging tubing 10 as will be discussed further in a subsequent paragraph. It is noted that rails 26, while allowing longitudinal axial movement back and forth, prevent head portion 22 from moving laterally thus maintaining alignment of head portion 22 with respect to clamping means 28. By way of the contrast, a portion of clamping means 28 may be fixedly attached to base 25, that is to say with respect to movement in the axial direction, and may be configured for firmly gripping tube 10 by rotational movement (although other means of engagement are within the scope of this invention), thereby allowing it to be reshaped while in contact with head portion 22. It is noted that a preferred embodiment illustrates head portion 22 that moves with respect to an axially fixed clamping means 28. However, it is to be construed that any manner of relative movement between head portion 22 and clamping means 28 may be chosen that is effective for reshaping the cross section of tube 10.

With continued reference to FIG. 2, clamping means 28 may include first and second clamping portions 30, 31. In one embodiment, first clamping portion 30 may be secured from axial movement with respect to base 25, as mentioned above. Although, it is recognized that first clamping portion 30 may be adjustable vertically and/or laterally or horizontally for aligning differently sized tubing 10 with head portion 22. Second clamping portion 31 may be pivotally connected with respect to first clamping portion 30. In this manner, clamping means 28 may be opened for inserting or removing tubing 10 and closed for firmly gripping tubing 10 during operation.

Clamping means 28 is fashioned to have channel 33 for receiving tubing 10. Channel 33 may be configured to receive, and more specifically to clamp onto, a variety of different diametered tubing. In various embodiments, the cross-section of channel 33 may be V-shaped or alternatively U-shaped or alternatively circular. Although, any configuration of channel 33 may be incorporated as is appropriate for use with the embodiments of the present invention. In one particular embodiment, first clamping portion 30 is similarly configured, or substantially identical, to second clamping portion 31. For example, the V-shaped or U-shaped or circular grooves may be cut into each face of first and second clamping portions 30, 31. Still, any configuration of channel 33 as formed in either of the first and second clamping portions 30, 31, may be chosen with sound engineering judgment. When the grooves are circular, it is preferred that the I.D. of the channel be slightly smaller than the O.D. of the tubing so as to minimize longitudinal axial movement of the tubing.

As illustrated above and in a preferred embodiment, clamping means includes an upper portion, a lower portion, the upper portion in rotational engagement with the lower portion in the preferred embodiment, recognizing that other modes of operational engagement are within the scope of the invention; the channel having a cross-sectional profile which is selected from the group consisting of "U"-shaped, "V"-shaped and "O"-shaped, and wherein when the upper and lower portions are in a closed position, the tubing is at least partially inwardly compressed when positioned within the channel for securing engagement therein thereby minimizing longitudinal axial movement therein. The inward compression may be accomplished by an inwardly projecting member within the channel or by the channel having a cross-sectional diameter which is smaller than the cross-sectional diameter of the tubing.

Referring now to FIGS. 2 and 3, head portion 22 may incorporate one or more shaping tools 40. The one or more shaping tools 40 may function to shape different portions of tube 10. In one embodiment, a first shaping tool 42 reshapes the I.D. of tubing 10. Conversely, a second reshaping tool 43 (illustrated in FIG. 3) may function to reshape the O.D. of tubing 10. The quantity of reshaping tools, as described, is not to be construed as limiting. Rather, any number of reshaping tools 40 may be implemented without departing from the intended scope of coverage of the embodiments of the subject invention. Additionally, in one embodiment, the temperature of one or all of reshaping tools 40 and/or 43 may be elevated above room temperature, the degree of increase being dependent upon the wall thickness of the tubing, the type of amount of fillers within the tubing walls, the degree of crosslinking associated with the tubing, the polymeric composition of the tubing, etc. In one embodiment, electric current may be induced within that portion of reshaping tool 40 that contacts tubing 10. Alternatively, heated air or a heated circulating fluid may be utilized to raise the temperature of reshaping tool 40. Although, any means may be employed to heat reshaping tools 40 as is appropriate for use with the embodiments of the present invention.

The first reshaping tool 42 may be configured to incorporate a tapered head 47 extending from a first maximum diameter to a second minimum diameter. Of course, it will be realized by persons of ordinary skill in the art that the maximum and minimum diameters of the first reshaping tool 42 define the range of tube inner diameters for which reshaper 20 may be used. In a manner consistent with that described above, tapered head 47 may slide into engagement with tubing 10, as securely gripped by clamping means 28, contacting the I.D. of tubing 10. Force applied to head portion 22 may therefore reshape the I.D. of tubing 10 in conformity with the external peripheral surface shape of first reshaping tool 42.

Similarly as illustrated in FIG. 3, second reshaping tool 43 may incorporate a tapered aperture 48, again extending from a first maximum diameter to a second minimum diameter in either a linear or non-linear fashion. It follows that the maximum and minimum diameters of second reshaping tool 43 define the range of tube outer diameters for which reshaper 20 may be used. Accordingly, by forcing contact of head portion 22 into engagement with tubing 10, its outer diameter will conform to the shape of the second reshaping tool 43.

Head portion 22 may be actuated to apply force used to reshape tubing 10 by manual and/or mechanized means. In one embodiment, an operator may apply force to the head portion 22 by physically moving tool head 22 into engagement with tubing 10 as needed to sufficiently reshape its cross-sectional profile. Leverage (e.g., knob 35) may be used to amplify the magnitude of force applied through head portion 22 in any manner chosen with sound judgment. Alternatively, head portion 22 may be actuated by motors or machines as energized from a power source. Still, any manner of applying force to head portion 22 for reshaping tubing 10 may be utilized as is appropriate for use with the embodiments of the present invention.

Referring to all of the Figures, the operation of reshaper 20 will now be described. An operator may clamp a section of polymeric tubing into clamping means 28 adjusting the position of the tubing so that the center aligns with reshaping tools 40. Once secured to the reshaper 20, head portion 22 may be arranged so that one or both of reshaping tools 40 reshape the cross section of the tubing. Subsequently, the operator engages the tool head in one or more cycles applying force to reshape the tubing into a generally symmetrical pattern in a preferred embodiment.

The best mode for carrying out the invention has been described for the purposes of illustrating the best mode known to the applicant at the time. The examples are illustrative only and not meant to limit the invention, as measured by the scope and spirit of the claims. The invention has been described herein with reference to the disclosed embodiments. Obviously, modifications and alterations will occur to others upon a reading and understanding of this specification. It is intended to include all such modifications and alterations insofar as they come within the scope of the appended claims or the equivalence thereof.

What is claimed is:

1. A polymeric tubing reshaping apparatus which comprises:
   a base;
   a tubing clamping means positioned on one side of said base;
   said tubing clamping means having a longitudinally disposed channel therein for positioning said tubing therein and minimizing movement of said tubing;
   a longitudinally axially movable tubing reshaping tool positioned at an opposed side of said base, where the tubing reshaping tool is an outer diameter reshaping member having a tube-receiving aperture with an initial interior diameter at a tubing insertion end of said aperture which decreases in size to a smaller interior diameter interior of said end, the initial interior diameter and said smaller interior diameter of the reshaping member defining the range of tube outer diameters for which the reshaping member may be used, the tube-receiving aperture operable to conform a tube end to the shape of the tube-receiving aperture by axially-forced contact only.

2. The apparatus of claim 1 wherein said clamping means further comprises:
   an upper portion;
   a lower portion;
   said upper portion in operational engagement with said lower portion;
   said channel has a cross-sectional profile which is selected from the group consisting of "U"-shaped, "V"-shaped and "O"-shaped; and wherein
      when said upper and lower portions are in a closed position, said tubing is at least partially inwardly compressed when positioned within said channel.

3. The apparatus of claim 2 wherein
   said inward compression is by an inwardly projecting member within said channel.

4. The apparatus of claim 2 wherein
   said inward compression is by said channel having a cross-sectional diameter which is smaller than a cross-sectional diameter of said tubing.

5. The apparatus of claim 1 wherein said reshaping tool comprises
   a longitudinally axially movable member having an aperture disposed therein;
   at least one insertable member into said aperture for modifying a cross-sectional profile of said tubing.

6. The apparatus of claim 2 wherein
   said upper and lower portions of said clamping means are in rotational engagement.

7. A polymeric profile reshaping apparatus for reshaping said polymeric profile from an initial profile in cross-section to a final profile in cross-section, said initial and final profiles differing in at least one dimension, which comprises:
   a base;
   a two portion profile clamping means positioned on one side of said base, said profile clamping means having a longitudinally disposed channel therein for positioning said profile therein and minimizing movement of said profile by at least partial inward compression on said profile;

a longitudinally axially movable member having a tube-receiving aperture disposed therein, said tube-receiving aperture matching said final profile in outer diameter, the tube-receiving aperture having an initial interior diameter at a tubing insertion end of said aperture which decreases in size to a smaller interior diameter interior of said end, the initial interior diameter and said smaller interior diameter of the tube-receiving aperture defining the range of tube outer diameters for which the reshaping member may be used, the tube-receiving aperture operable to conform a tube end to the shape of the tube-receiving aperture by axially-forced contact only.

8. The apparatus of claim 7 where said polymeric profile is crosslinked polyethylene.

9. The apparatus of claim 1 where said tubing is crosslinked polyethylene.

* * * * *